United States Patent [19]

Yasukawa

[11] Patent Number: 5,291,238
[45] Date of Patent: Mar. 1, 1994

[54] PHOTOMETERING CIRCUIT

[75] Inventor: Seiichi Yasukawa, Kawasaki, Japan

[73] Assignee: Nikon Corporation, Tokyo, Japan

[21] Appl. No.: 898,323

[22] Filed: Jun. 15, 1992

[30] Foreign Application Priority Data

Jun. 24, 1991 [JP] Japan .................................. 3-177812

[51] Int. Cl.$^5$ ................................................ G03B 7/08
[52] U.S. Cl. .................................... 354/425; 250/214 L
[58] Field of Search ................ 354/425; 250/214 P, 250/214 L

[56] References Cited

U.S. PATENT DOCUMENTS

| 4,076,977 | 2/1978 | Tsunekawa et al. | 354/425 |
| 4,462,670 | 7/1984 | Maida | 354/425 |
| 4,639,134 | 1/1987 | Bletz | 354/425 |

FOREIGN PATENT DOCUMENTS 55-037954  3/1980  Japan .
56-49927   5/1981  Japan .

*Primary Examiner*—Russell E. Adams
*Attorney, Agent, or Firm*—Shapiro and Shapiro

[57] ABSTRACT

A photometering circuit comprises a photo-diode, an operational amplifier, a feedback diode and a latch releasing transistor. In a circuit utilizing a PNP transistor, for example, a cathode of the photo-diode is connected to a non-inverting input terminal of an operational amplifier and a reference potential, an anode of the photo-diode is connected to an inverting input terminal of the operational amplifier and an anode of the feedback diode, a cathode of the feedback diode is connected to an output terminal of the operational amplifier, a base of the PNP transistor is connected to the reference potential and a collector of the PNP transistor is connected to the inverting input terminal of the operational amplifier.

4 Claims, 3 Drawing Sheets

PHOTOMETERING CIRCUIT

BACKGROUND OF THE INVENTION

1. Field of the Invention

The present invention relates to a photometering circuit applicable to optical equipment such as a camera.

2. Related Background Art

In optical equipment such as a camera, a photometering circuit which uses a photo-diode as a photo-sensing device has been used to measure a light intensity. The photometering circuit usually has a circuit configuration as shown in FIG. 1 which supplies a current flowing through a photo-diode PD in proportion to a light intensity, to a diode Q1 (which is a collector-base connected transistor in an IC) to produce a voltage across the diode Q1 so that the light intensity is logarithmically compressed to secure a wide dynamic range. In FIG. 1, $V_k$ denotes a reference voltage supply.

In the photometering circuit of FIG. 1, the photo-diode PD is connected to an operational amplifier OP with a cathode thereof connected to a reference potential and an anode thereof connected to an inverting input terminal The photo-diode PD may be connected in the reverse direction. In this case, the negative feedback diode Q1 is also connected in the reverse direction, but the basic concept of the circuit operation does not change. The following description is applied to the connection shown in FIG. 1.

The photometering circuit of FIG. 1 may cause a so-called latch phenomenon in which a potential at the inverting input terminal of the operational amplifier OP is lower than a potential at a non-inverting input terminal when virtual short-circuit condition across the input terminals of the operational amplifier OP is effectively lost due to an external noise, whereby a potential at an output terminal $V_{out}$ swings to a maximum level. In this case, since the diode Q1 which is the negative feedback element is fixed in an off state, it is not possible for the circuit to spontaneously return to a normal operation condition.

This phenomenon is unavoidable so long as the non-linear element is used for the feedback, and many proposals to quickly release the phenomenon have been made.

FIG. 2 shows a photometering circuit which includes a simplest device to release the latch. In the present circuit, a diode Q3 is added anti-parallelly to the negative feedback diode Q1. When the latch phenomenon is to occur, the output terminal $V_{out}$ functions to pull up the potential at the inverting input terminal through the diode Q3 so that the balance between the input terminals is immediately recovered to the normal operation condition.

However, the photometering circuit shown in FIG. 2 has a problem in a response speed of the output to a change of an input light and the response speed is lower than that of the basic circuit shown in FIG. 1 which has no latch release device. The reason is as follows Since each semiconductor device comprises a P-N junction, a parallel junction capacitance is present across terminals When such a junction capacitance is taken into consideration, the photo-metering circuit of FIG. 2 which includes the latch release device is represented by a circuit shown in FIG. 3. A capacitor C1 is parallelly connected to the negative feedback diode Q1, a capacitor C2 is parallelly connected to the photo-diode PD, and a capacitor C5 is parallelly connected to the latch release diode Q3. The respective capacitances are approximately $C_1 = C_5 = 0.5$ pF and $C_2 = 100$ pF. In order for the output voltage $V_{out}$ to change to follow the change in the input light intensity, the photo-current from the photo-diode PD must charge up the capacitors C1 and C5 parallelly connected to the diodes to a proper output voltage level, and the response of the output voltage is delayed by the time required for such charge. Since the delay time is affected by the photo-current and the capacitance of the feedback stage, the smaller the light intensity to be measured is and the larger the capacitance of the feedback stage is, the longer is the delay time. Since the capacitance of the feedback stage of the photometering circuit of FIG. 2 which includes the prior art latch release device is larger than that of the basic circuit of FIG. 1, the response speed is lower.

Although an absolute value of the capacitance of the capacitor C2 parallel to the photo-diode is large, the terminals are virtually short-circuited during the normal operation of the operational amplifier OP and the bias voltage does not substantially change even if the light intensity changes. Specifically, it changes only for 1/open-loop gain of the output voltage change. Accordingly, the effect on the response speed is usually smaller than that by the capacitance of the feedback stage.

The prior art apparatus thus includes a problem of lowering the response speed of the output to the change of the input light when the latch release device is added to the photometering circuit.

SUMMARY OF THE INVENTION

In view of the above, it is an object of the present invention to provide a photometering circuit which has a latch release device and which does not lower a response speed.

In order to achieve the above object, a first embodiment of the present invention includes one additional PNP transistor in a basic photometering circuit of a type which uses a cathode of a photo-diode as a reference potential, with an emitter, a collector and a base thereof being connected to an output terminal, an inverting input terminal and a non-inverting input terminal of an operational amplifier, respectively.

In the first embodiment of the present invention, when the photometering circuit is to go into the latched state, the potential of the non-inverting input terminal to which the base of the additional PNP transistor is connected becomes lower than the potential of the output terminal to which the emitter is connected, and when a voltage difference therebetween exceeds approximately 0.6 volt, the transistor is turned on to act to raise the potential of the inverting input terminal. Thus, the latched state can be released. Further, since a capacitive component which is a cause of delay of response to the change of input light does not increase by the addition of the PNP transistor, the response speed is not lowered in the normal operation mode.

A second embodiment of the present invention includes one additional PNP transistor in a basic photometering circuit of a type in which a cathode of a photo-diode is used as a reference potential, with a collector, an emitter and a base thereof being connected to an output terminal of an operational amplifier, an inverting input terminal and a non-inverting input terminal, respectively, to form a latch release device.

In the second embodiment of the present invention, when the photometering circuit is to go into the latched state, the potential of the output terminal to which the collector of the additional PNP transistor is connected becomes higher than the potential of the non-inverting input terminal to which the base is connected, and when a voltage difference therebetween exceeds approximately 0.6 volt, the transistor is turned on as a backward transistor (the emitter and the collector are opposite) to serve to raise the potential of the inverting input terminal so that the latched state is released. In the latch release mode, a further base current flows because a current is injected to the inverting input terminal, but where the photometering circuit is constructed on an IC, one of the collector and the emitter of the reverse-connected PNP transistor through which a larger current flows may be assigned to a larger area terminal. Further, the response speed is not lowered in the normal operation mode by the same reason as that of the first embodiment.

A third embodiment of the present invention includes one additional NPN transistor in a basic photometering circuit of a type in which an anode of a photo-diode is used as a reference potential, with an emitter, a collector and a base thereof being connected to an output terminal of an operational amplifier, an inverting input terminal and a non-inverting input terminal, respectively, to form a latch release device.

In the third embodiment of the present invention, when the photometering circuit is to go into the latched state, the potential of the output terminal to which the emitter of the additional NPN transistor is connected becomes lower than the potential of the non-inverting input terminal to which the base is connected, and when a voltage difference therebetween exceeds approximately 0.6 volt, the transistor is turned on to serve to lower the potential of the inverting input terminal so that the latched state is released. Since a capacitive component which is a cause of the delay of response to the change of input light does not increase by the addition of the NPN transistor, the response speed is not lowered in the normal operation mode.

A fourth embodiment of the present invention includes one additional NPN transistor in a basic photometering circuit of a type in which an anode of a photo-diode is used as a reference potential, with a collector, an emitter and a base thereof being connected to an output terminal of an operational amplifier, an inverting input terminal and a non-inverting input terminal, respectively, to form a latch release device.

In the fourth embodiment of the present invention, when the photometering circuit is to go into the latched state, the potential of the output terminal to which the collector of the NPN transistor is connected becomes lower than the potential of the non-inverting input terminal to which the base is connected, and when a voltage difference therebetween exceeds approximately 0.6 volt, the transistor is turned on as a backward transistor (the emitter and the collector are opposite) to serve to raise the potential of the inverting input terminal so that the latched state is released. In the latch release mode, a further base current flows in order to inject a current to the inverting input terminal, but where the NPN transistor is reverse-connected in the photometering circuit on an IC, either the collector or the emitter through which a larger current flows may be assigned as a larger area terminal. Further, the response speed is not lowered in the normal operation mode by the same reason as that of the third embodiment.

DETAILED DESCRIPTION OF THE PREFERRED EMBODIMENTS

The embodiments of the present invention are now explained in detail with reference to the drawings.

Figure 4:
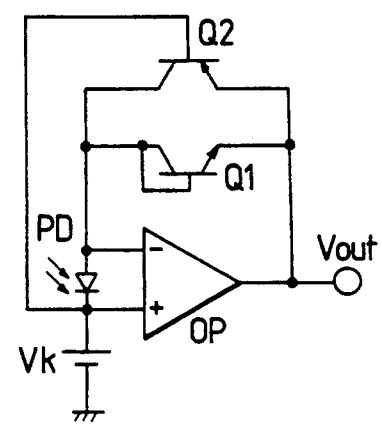
FIG. 4 shows a circuit diagram of a first embodiment of the present invention.

FIG. 4 shows a circuit diagram of a first embodiment of a photometering circuit of the present invention. In FIG. 4, a cathode of a photo-diode PD, a non-inverting input terminal of an operational amplifier OP and a base of a PNP transistor Q2 are connected to a positive (+) terminal of a reference voltage source $V_k$ which outputs a predetermined fixed voltage with respect to a GND level. An anode of the photo-diode PD is connected to an inverting input terminal of the operational amplifier OP, an anode of a diode Q1 and a collector of the PNP transistor Q2. Where the diode Q1 is formed on an IC, a collector and a base of an NPN transistor are connected to serve as the anode and an emitter serves as the cathode, although it is referred to as the diode in the present embodiment. The cathode of the diode Q1 is connected to an output terminal of the operational amplifier OP and an emitter of the PNP transistor Q2. An output terminal $V_{out}$ is common to the output terminal of the operational amplifier OP and it is an output terminal of the present photometering circuit.

An operation of the embodiment of FIG. 4 is now described.

The non-inverting input terminal of the operational amplifier OP is fixed to the potential of the reference voltage source $V_k$ and it is in a low impedance state.

In a normal operation mode, if an input light is a steady state light, the photo-diode PD generates a photo-current $I_{PD}$ in proportion to the directed light intensity and almost all of the current flows into the diode Q1 because the input terminal of the operational amplifier OP is at a high impedance and no current flows into the collector of the PNP transistor Q2 since the base-emitter thereof is reverse-biased as will be explained later. Accordingly, the output terminal of the operational amplifier OP operates to absorb all of the photo-current $I_{PD}$ flowing out of the photo-diode PD so that the potential at the cathode terminal of the diode Q1 is stabilized at a potential which is lower than the potential at the inverting input terminal which is in a virtual short-circuit status with the potential of the reference voltage source $V_k$, by a forward voltage $V_F$ of the diode Q1. Specifically, the output terminal voltage $V_{out}$ of the present photometering circuit is given by the following formula and the output voltage corresponds to the logarithmically compressed input light intensity.

$$V_{out} = V_k - (kT/q)\ln(I_{PD}/I_s)$$

where k: Boltzmann's constant
q: charge of electron
T: absolute temperature
$I_s$: backward saturation current of diode Q1

A response of the output to a change of the input light is explained with reference to FIG. 5.

Figure 5:
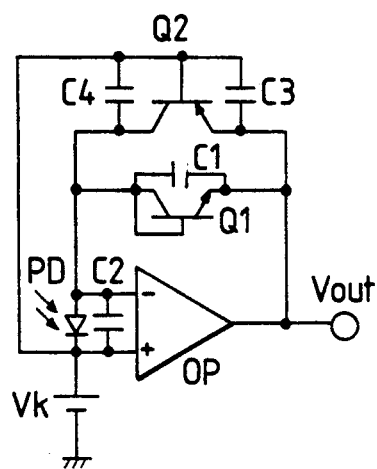
FIG. 5 shows a circuit diagram to supplement FIG. 4.
Figure 6:
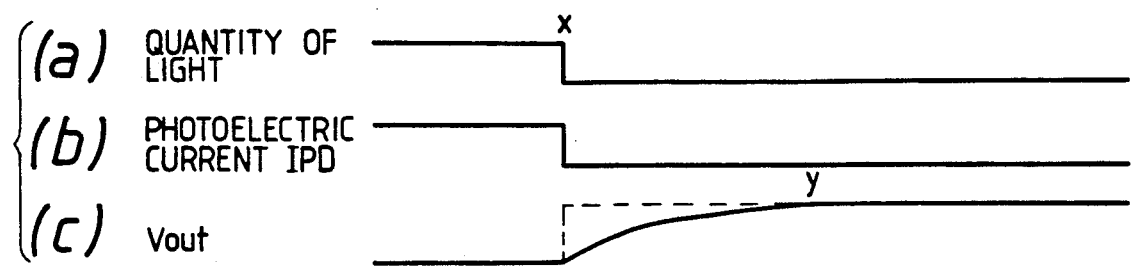
FIG. 6 shows operational waveforms in the first embodiment.

FIG. 5 shows a circuit diagram which also shows capacitive components included in the semiconductor devices of the first embodiment. In the stable state to the steady state light, a capacitor C2 and a capacitor C4 across the input terminals of the operational amplifier OP are charged substantially to zero voltage, a capacitor C1 across a feedback diode Q1 is charged to the forward voltage $V_F$ of the diode Q1 and a capacitor C3 across the base and the emitter of the PNP transistor Q2 is charged substantially to the forward voltage $V_F$ of the diode Q1. When the input light intensity rapidly decreases from the steady state, for example, when the light intensity drops as shown by X on a waveform of FIG. 6(a), the photo-current $I_{PD}$ also drops as shown in FIG. 6(b). The output terminal of the operational amplifier OP attempts to raise the potential, but the output potential cannot be instantly raised to the level corresponding to the photo-current because of the capacitor C1 across the feedback diode Q1 and it is raised after the capacitor C1 has been charged. Since the current to charge the capacitor C1 can be supplied only by the photo-current $I_{PD}$, a certain time period is required before the output voltage $V_{out}$ changes to the level corresponding to the photo-current and stabilizes thereat (point y) as shown in FIG. 6(c) when the light intensity after the input change is low. In the circuit of FIG. 5, it is only the magnitude of the photo-current and the magnitude of the capacitance of the capacitor C1 that influences the output delay time and the capacitances of other capacitors C2, C3 and C4 do not substantially contribute to the delay. The capacitors C2 and C4 are connected to the common terminals of the circuit and the degree of contribution of those capacitors to the delay of the output of the operational amplifier is only for the change of the bias potential. It is only a reciprocal of a gain of the amplifier when viewed from the output voltage. In particular, a sum of the capacitances of the capacitors C2 and C4 is substantially determined by the capacitance of the capacitor C2 which is at most several hundred pF. If the gain of the amplifier is 10,000, the degree of contribution is only several hundred pF/10,000 compared to 0.5 pF for the capacitor C1, so it is negligible. Since the capacitance of the capacitor C3 is present between the low impedance non-inverting input terminal and the low impedance amplifier output terminal, it is not necessary to consider the delay in the charge and discharge.

When the latch phenomenon is to take place due to an external noise, the potential at the inverting input terminal of the operational amplifier OP tends to drop and the potential at the output terminal tends to rise. However, when the potential at the output terminal $V_{out}$ becomes higher than the reference voltage source $V_k$ by approximately 0.6 volt, the base current of the PNP transistor Q2 starts to flow so that the PNP transistor Q2 is turned on and starts to flow a current from the collector. As a result, the capacitors C1, C2 and C4 associated with the inverting input terminal are charged by the collector current of the PNP transistor Q2 and the potential at the inverting input terminal which tended to drop now rises. When the potential slightly exceeds the potential at the non-inverting input terminal, a feedback is applied from the output terminal so that the photometering circuit is finally stabilized at a normal operating point.

Figure 1:
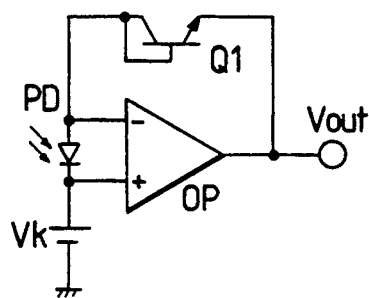
FIG. 1 shows a circuit diagram of a basic photometering circuit.
Figure 2:
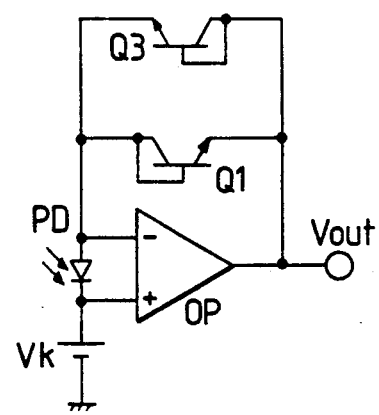
FIG. 2 shows a diagram of a prior art photo-metering circuit with a latch release function.
Figure 3:
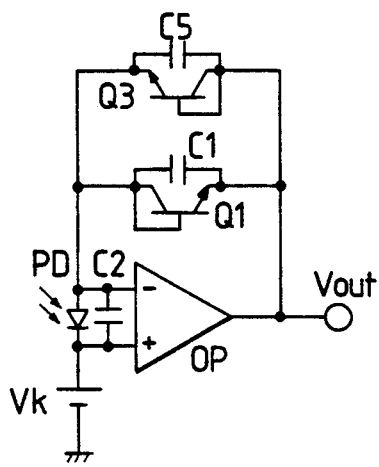
FIG. 3 shows a circuit diagram to supplement FIG. 2.

In the present embodiment, the stable latch release operation is attained without lowering the output response speed of the basic photometering circuit by merely adding the PNP transistor Q2 as shown in FIG. 4 to the basic photometering circuit shown in FIG. 1.

Figure 7:
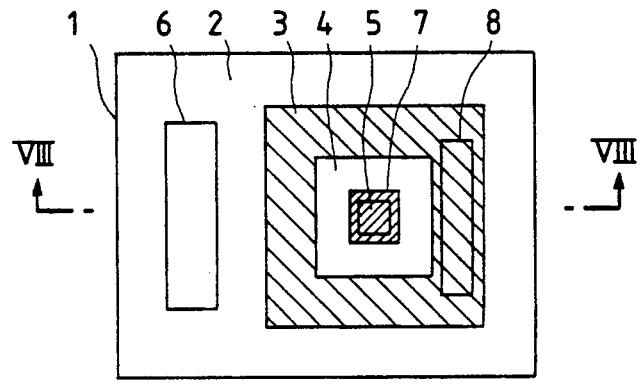
FIG. 7 shows a transistor structure on an IC.
Figure 8:
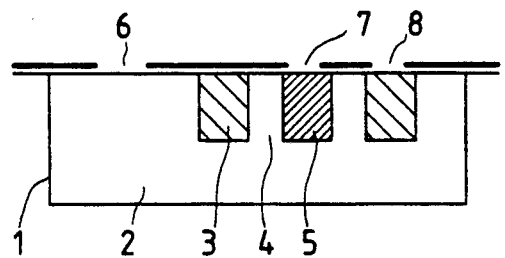
FIG. 8 shows a sectional view taken along a line VIII—VIII of FIG. 7.

The photometering circuit of the first embodiment is usually formed on an IC (integrated circuit) except at least the photo-diode PD in present day technology. In such a case, the PNP transistor Q2 is formed by a lateral PNP transistor. FIG. 7 shows a plan view of a conventional lateral PNP transistor and FIG. 8 shows a sectional taken along a line VIII—VIII of FIG. 7. Numeral 1 denotes a frame of an island (n-type semiconductor partitioned by isolation), and numeral 2 denotes an n-type semiconductor region which forms the island and which is integral with a central area 4 through a bottom of the island. The central area forms the base of the PNP transistor. Numeral 5 denotes a p-type semiconductor region implanted into the island and it forms the emitter of the PNP transistor. A semiconductor island region 3 implanted to surround the p-type semiconductor region 5 with an n-type semiconductor region 2 interleaved therebetween forms the collector of the PNP transistor. Areas 6, 7 and 8 are contact holes for electrically connecting the base, the emitter and the collector to other elements.

The currents flowing through the junctions of the PNP transistor Q2 in the latch release operation are now considered. The current which flows from the emitter 7 to the collector 8 through the base 6 need only charge the capacitances of the capacitors C1, C2 and C4 shown in FIG. 5 before the latched state is released. On the other hand, the current which flows from the emitter 7 to the base 6 can be of great amplitude momentarily because both terminals are in the lower impedance state and the PNP transistor Q2 is in the saturation state.

Figure 9:
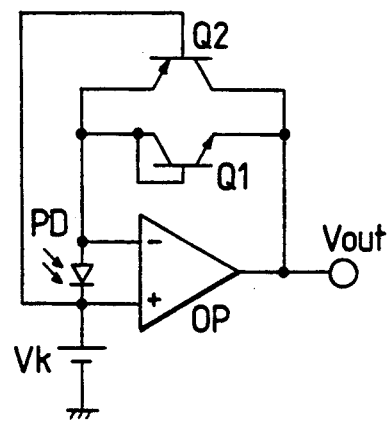
FIG. 9 shows a circuit diagram of a second embodiment of the present invention.

A second embodiment of the present invention is shown in FIG. 9.

In the present embodiment, only the collector and the emitter of the PNP transistor Q2 of the first embodiment of FIG. 4 are interchanged. The operation, the output voltage in the normal operation mode and the response speed for the change of the input light are identical to those of the first embodiment. The only difference is that the PNP transistor Q2 operates in the reverse-connected transistor mode (the emitter and the collector are opposite) in the latch release mode. As described above, in the latch release mode, the emitter-to-base current is larger than the collector current of the PNP transistor Q2 in the first embodiment. As explained with reference to FIGS. 7 and 8, the junction area of the emitter and the base is smaller than the junction area of the collector and the base in the lateral PNP transistor. Thus, in a worst case, the emitter may break down. In the second embodiment of FIG. 9, the PNP transistor Q2 for releasing the latch is connected to operate as the reverse-connected transistor so that the larger area can be assigned to the collector-base junction. There is no difference in the transistor operation of the switching device.

Figure 10:
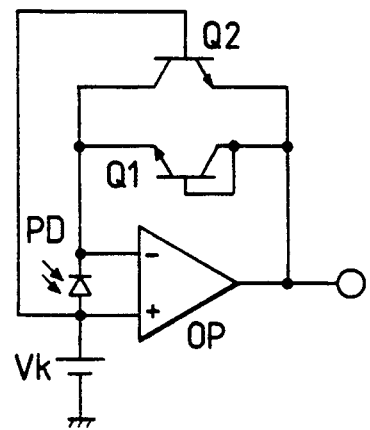
FIG. 10 shows a circuit diagram of a third embodiment of the present invention.

FIG. 10 shows a circuit diagram of a third embodiment of the present invention.

The present embodiment applies the concept of the first embodiment shown in FIG. 4 to a photometering circuit in which a photo-diode PD is oriented to use an anode as a reference potential. The configuration and the operation of the present embodiment are in a complementary relation to those of the first embodiment and can be readily understood. Therefore, detailed description thereof is omitted.

Figure 11:
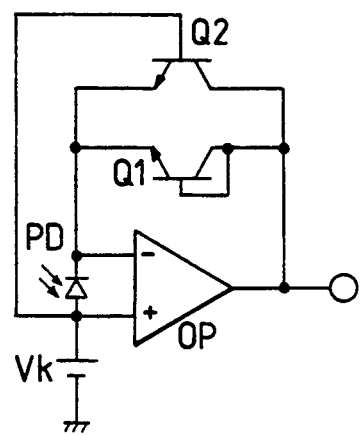
FIG. 11 shows a circuit diagram of a fourth embodiment of the present invention.

FIG. 11 shows a circuit diagram of a fourth embodiment of the present invention.

The present embodiment applies the concept of the second embodiment shown in FIG. 9 to a photometering circuit in which the photo-diode is oriented to use the anode as the reference potential. The configuration and the operation of the present embodiment are in a complementary relation to those of the second embodiment and can be easily understood. Therefore, detailed description thereof is omitted.

In accordance with the present invention, the function to immediately release the latch phenomenon due to the external noise without lowering the output response speed of the basic photometering circuit is attained by merely adding one transistor to the basic photometering circuit. The present photometering circuit is suitable for the photometering circuit used to control a stroboscope light of a camera where a high speed response is required. Where the switching operation of the additional transistor is performed by the reverse-connected transistor, the base current which is large in the latch release mode can flow through the collector-base junction having a larger junction area so that the breakdown of the device is prevented.

What is claimed is:

1. A photometering circuit comprising:
   a photo-diode;
   an operational amplifier;
   a feedback diode; and
   a latch releasing PNP transistor;
   a cathode of said photo-diode being connected to a non-inverting input terminal of said operational amplifier and a reference potential, an anode of said photo-diode being connected to an inverting input terminal of said operational amplifier and an anode of said feedback diode, a cathode of said feedback diode being connected to an output terminal of said operational amplifier, an emitter of said PNP transistor being connected to the output terminal of said operational amplifier, a base of said PNP transistor being connected to said reference potential and a collector of said PNP transistor being connected to the inverting input terminal of said operational amplifier.

2. A photometering circuit comprising:
   a photo-diode;
   an operational amplifier;
   a latch releasing PNP transistor;
   a cathode of said photo-diode being connected to a non-inverting input terminal of said operational amplifier and a reference potential, an anode of said photo-diode being connected to an inverting input terminal of said operational amplifier and an anode of said feedback diode, a cathode of said feedback diode being connected to an output terminal of said operational amplifier, a collector of said PNP transistor being connected to the output terminal of said operational amplifier, a base of said PNP transistor being connected to said reference potential and an emitter of said PNP transistor being connected to the inverting input terminal of said operational amplifier.

3. A photometering circuit comprising:
   a photo-diode;
   an operational amplifier;
   a feedback diode; and
   a latch releasing NPN transistor;
   an anode of said photo-diode being connected to a non-inverting input terminal of said operational amplifier and a reference potential, a cathode of said photo-diode being connected to an inverting input terminal of said operational amplifier and a cathode of said feedback diode, an anode of said feedback diode being connected to an output terminal of said operational amplifier, an emitter of said NPN transistor being connected to the output terminal of said operational amplifier, a base of said NPN transistor being connected to said reference potential and a collector of said NPN transistor being connected to the inverting input terminal of said operational amplifier.

4. A photometering circuit comprising:
   a photo-diode;
   an operational amplifier;
   a feedback diode; and
   a latch releasing NPN transistor;
   an anode of said photo-diode being connected to a non-inverting input terminal of said operational amplifier and a reference potential, a cathode of said photo-diode being connected to an inverting input terminal of said operational amplifier and a cathode of said feedback diode, an anode of said feedback diode being connected to an output terminal of said operational amplifier, a collector of said NPN transistor being connected to the output terminal of said operational amplifier, a base of said NPN transistor being connected to said reference potential and an emitter of said NPN transistor being connected to the inverting input terminal of said operational amplifier.

* * * * *